United States Patent Office 3,517,291
Patented June 23, 1970

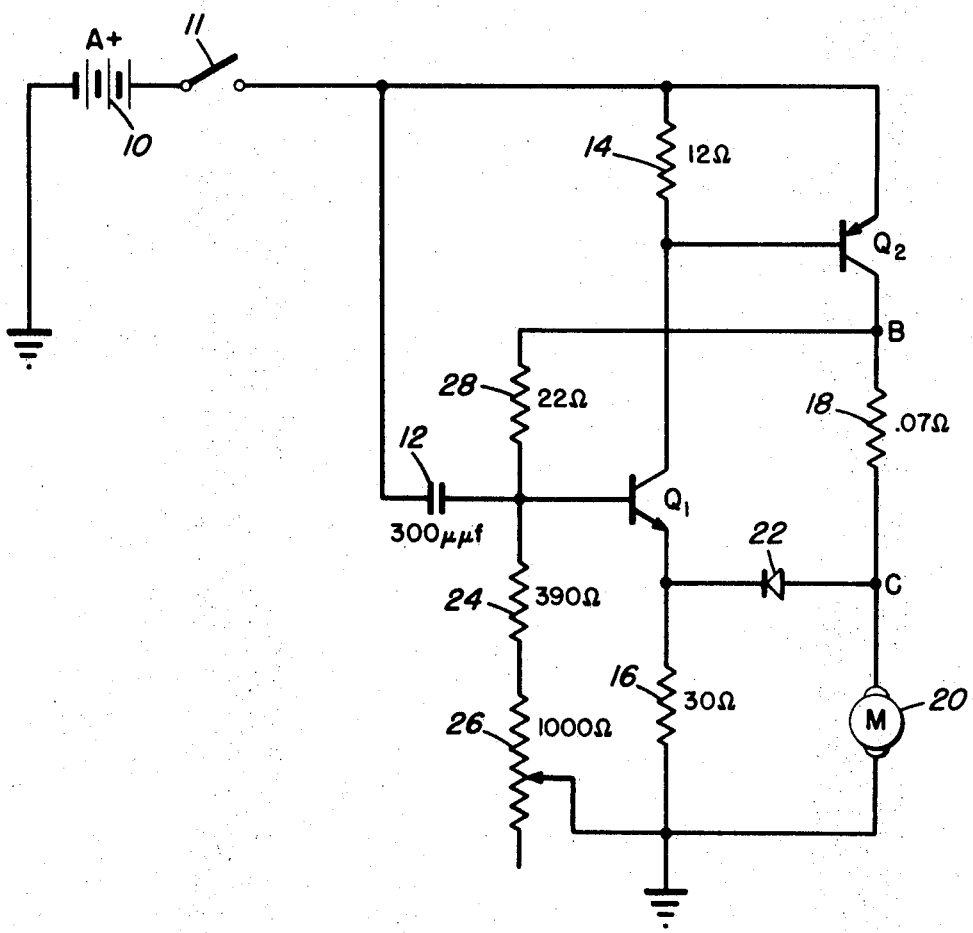
WINFORD B. CARRUTH
INVENTOR
BY
ATTORNEY

---

3,517,291
ELECTRIC MOTOR SPEED CONTROL
Winford B. Carruth, Baltimore, Md., assignor to The Bendix Corporation, a corporation of Delaware
Filed May 29, 1967, Ser. No. 641,966
Int. Cl. H02p 5/12
U.S. Cl. 318—332                             5 Claims

ABSTRACT OF THE DISCLOSURE

A continuously variable constant speed regulator for a permanent magnet motor utilizing a two transistor electrical circuit wherein a first transistor is used to control motor current and a second transistor is used to control the first transistor. A manually positioned continuously variable potentiometer is used to vary the second transistor base to emitter voltage thereby permitting continuously variable motor speed regulation.

BACKGROUND OF THE INVENTION

The characteristics and advantages of permanent magnet D.C. motors are well known. In the smaller sizes these motors are preferred over the wound field types in that permanent magnet motors are smaller, lighter, and require less power and generate less heat because the wound field is replaced by a permanent magnet. Since they generate less heat, the need for internal fans and ventilation is reduced with resultant reduction in windage and friction losses. The speed of these motors when the load is constant is directly related to applied voltage and thus the speed can be easily controlled. Obviously, the applied voltage must be constant in order to operate the motor at a constant speed with load remaining constant. When used in an environment wherein the applied voltage can be expected to vary widely such as in an automobile, constant speed performance could not be expected. Additionally, since increased load at constant applied voltage causes a decrease in speed and increase in current, variations in loading would produce variations in output speed unless applied voltage is also varied to compensate therefor.

SUMMARY OF THE INVENTION

Accordingly, an electrical circuit has been devised for use with a permanent magnet D.C. motor which will supply to the motor armature a manually set infinitely variable armature voltage which will remain essentially constant under conditions of widely varying input voltage and will vary in response to changing load conditions. This is accomplished by referring one side of the motor armature winding to ground, sensing the armature voltage and current to develop a feedback signal and feeding this feedback signal through a feedback loop containing a feedback transistor to set the conductance of a control transistor serially connected with the armature. The operating level of the feedback transistor is set by a continuously variable potentiometer, thereby allowing an infinitely variable basic control voltage and hence, control speed to be set.

The single figure of the drawing is a schematic diagram of the invention.

DESCRIPTION OF THE PREFERRED EMBODIMENT

Referring to the figure, a permanent magnet D.C. motor 20 is shown having one side of its armature connected to ground. Power is supplied to the armature from a source of positive potential 10 through the emitter-collector path of control transistor Q2 and resistor 18. A parallel current path is disposed between power supply 10 and ground through resistors 14 and 16 and the collector-emitter path of feedback transistor Q1. The voltage at point B is sensed through resistor 28 by the base terminal of transistor Q1, while armature voltage is fed back to the emitter of transistor Q1 through diode 22 so that such armature voltage is sensed by the Q1 emitter only when the armature voltage exceeds Q1 emitter voltage by the forward voltage drop through diode 22.

Closing switch 11 causes a charging pulse to be applied across capacitor 12 onto the base electrode of transistor Q1, turning on Q1. The resulting current flow through Q1 decreases the voltage on the base of transistor Q2 due to the voltage drop across resistor 14, biasing Q2 into conduction thereby supplying current to motor 20 so that motor 20 starts to rotate. As will be explained, when motor 20 is substantially below desired speed as set by potentiometer 26, Q2 is current saturated so that motor voltage drop is principally dependent on the D.C. resistance drop across the motor armature, since as stated, the motor is substantially below speed and motor back E.M.F., which is dependent upon motor speed, is very low. The voltage at reference point C is therefore insufficient to overcome diode 22 forward voltage drop and diode 22 is effectively shut off. This results in Q1 emitter being referenced directly to ground through resistor 16. This results in a regenerative turn-on of both transistors which proceeds rapidly to the point where both transistors are saturated, thereby allowing motor 20 to develop maximum starting torque. This is especially important when motor speed control 26 is set for a low speed, since full voltage is applied to the motor until it nears the set speed. As motor speed increases, motor current decreases, decreasing the voltage drop across resistor 18 and increasing the voltage on the anode of diode 22 to the point where diode 22 conducts, thereby increasing the voltage on the emitter of Q1 decreasing the $V_{BE}$ of Q1. The conductance of Q1 decreases, causing the voltage drop through resistor 14 to decrease, increasing the base voltage of transistor Q2, decreasing its conductance and the voltage at reference point B. The voltage at reference point B with respect to ground, which, since the voltage drop across resistor 18 is very small, and one side of the motor is connected to ground is the voltage upon which motor speed is dependent, the motor speed control 26 being set at some constant value of resistance, is determined by A+ line voltage and the conductance of transistors Q1 and Q2 which is determined by their respective base to emitter voltages. The base to emitter voltage of Q2 is dependent solely on the current flow through resistor 14 which is determined mainly by the conductance of transistor Q1 which in turn is determined primarily by Q1 base to emitter voltage. At steady state conditions, Q1 base voltage is determined by reference point B voltage less the voltage drop across resistor 28, while Q1 emitter voltage is determined by reference point B voltage less the voltage drop across resistor 18 and diode 22. Thus, for every value of voltage with respect to ground at reference point B there is a corresponding value of Q1 base to emitter voltage, which, as has been discussed, determines the conductance of Q2. At steady state conditions, of course, the conductance of Q2 determines the voltage at reference point B and hence the speed of motor 20. We have thus seen that the Q1 base to emitter voltage determines the speed of motor 20 under steady state conditions, with an increase in Q1 base to emitter voltage increasing the conductance of Q2 and hence increasing motor speed. As speed control potentiometer 26 is varied, Q1 base to emitter voltage is changed, hence changing motor speed.

If the load on motor 20 increases, motor speed would tend to decrease and motor current tend to increase. However, voltage at reference point B tends to remain constant since neither A+ line voltage or Q2 emitter to base voltage has changed. This results in a redistribution of voltage drops between reference point B and ground across resistor 18 and motor 20 toward a new state where the current times the combined D.C. resistance of motor 20 and resistor 18 plus the back E.M.F. developed by the motor will equal the voltage at reference point B. Since the current attempts to remain constant due to the constant conductance of Q2, the motor back E.M.F. must decrease causing an overall decrease in voltage at reference point C. This causes a decrease in Q1 emitter voltage, increasing Q1 base to emitter voltage, which as has been discussed, will increase the conductance of Q2 and hence the voltage at reference point B, thereby tending to increase motor speed to its preset value. Additionally the current through diode 22 is non-linearly related to diode voltage drop. At room temperature this relationship is:

$$I = K(e^{39v} - 1)$$

where:

I is diode current,
V is diode forward voltage bias, and
K is a constant.

Thus, small changes in diode forward voltage produce large changes in diode current resulting in very close speed control.

A reverse mechanism is initiated when motor load is decreased whereby motor speed tends to increase causing a resultant increase in motor back E.M.F. so that reference point C voltage increases, increasing Q1 emitter voltage with resultant decrease in reference point B voltage thus tending to restore motor speed to its original value.

If voltage supplied by source 10 should now increase, the voltage at reference point B will also tend to increase. Normally this increase in voltage would also cause linearly increased current to flow in resistors 18 and 28, which effect would tend to maintain Q1 base to emitter voltage constant. However, since the absolute value of voltage at reference point B has increased, the absolute value of voltage at reference point C will also rise, thereby increasing the forward voltage drop across diode 22 and causing diode current to increase non-linearly. Q1 emitter voltage attempts to increase non-linearly in response to the non-linear increase in diode current as follows:

$$\Delta V_2 = KRe^{39v}$$

where:

$\Delta V_2$ = the rise in Q1 emitter voltage,
K = constant dependent on diode type,
R = resistance of resistor 16, and
V = diode forward voltage bias.

It can be seen that the increase in Q1 emitter voltage is greater than the increase in Q1 base voltage resulting in a decrease of Q1 base to emitter voltage, thereby, as has been previously discussed, causing a reduction in reference point B voltage. As was also true in the case where load varied, the extreme non-linearity of the diode permits very close speed control.

Conversely, as voltage supplied by source 10 decreases, diode 22 current decreases non-linearly resulting in a non-linear drop in Q1 emitter voltage and non-linear increase in Q1 base to emitter voltage which tends to increase the conductance of Q2 to maintain motor speed.

It can be seen that if Q1 becomes non-conductive, Q2 also becomes non-conductive so that the circuit is effectively shut-down until another charging pulse is applied across capacitor 12. This characteristic is utilized to protect the transistors from disastrous dissipation in the event the motor is short-circuited. If the motor is short-circuited, reference point C goes to ground back biasing diode 22 and apparently full line voltage is applied across resistor 18 which is in the order of .07 ohm. However, Q2 becomes current limited so that the voltage at reference point B with respect to ground potential and which is due to the voltage drop across resistor 18 approaches ground potential and is thus unable to maintain transistor Q1 forward drive. Q1 thus falls out of condition. Additionally, capacitor 12 charges to almost full line voltage through resistor 28. Current flow can then only be re-established by removing the short and opening switch 11 long enough to allow a substantial leak-down of capacitor 12 charge so that an adequate charging pulse will flow when switch 11 is again closed.

A resistor in place of capacitor 12 would avoid the initial non-conductive condition but would not provide the desirable short-circuit protection. Additionally, capacitor 12 functions as a filter which prevents motor commutation spikes from appearing on the base of Q1.

Choice of the values of resistors 14, 18 and 28 determines the gain of the transistor pair, which also varies with the characteristics of the individual transistors. When the motor is below speed, the voltage drop across the motor is very low, with a limiting value determined by the stalled rotor resistance, so that diode 22 is non-conductive. This raises the loop gain so high as to cause the transistor pair to be saturated applying maximum drive current to the motor. As the motor increases speed, the voltage across the motor increases until diode 22 conducts, at which time steady state conditions are approached and attained as previously discussed.

In determining the proper values of the elements of this circuit it is first necessary to determine the D.C. motor resistance, which, since resistor 18 is quite small, determines the amount of current Q2 must handle when saturated. In the circuit described, D.C. motor resistance is one ohm. Since this leads to the choice of a fairly large transistor, resistor 14 must be chosen to avoid thermal runaway without diverting a significant part of Q2 base current. Resistor 16 is now chosen to provide the base current needed to saturate Q2 at a minimum A+ supply voltage with resistor 14 in place. This additionally establishes the maximum Q1 collector current which will flow at maximum supply voltage, thus providing a basis for the choice of Q1. Additionally, Q1 should not exhibit a thermal cross-over of base to emitter voltage within the normal operating range of current and temperature as this makes compensation difficult. A diode is then selected having similar voltage and thermal characteristics as Q1, which generally will occur when the base material and junction type and doping are similar to that of the transistor.

Now, if we open potentiometer 26 and short-circuit resistor 18, motor current could be controlled through its specified working range by inserting a small variable voltage in series with resistor 28. With resistor 28 equal to 22 ohms as shown, this control voltage may rise to as much as one volt to saturate the transistors at full peak current for high supply voltage and stalled rotor. Having determined this voltage, resistor 18 is assigned a value which will produce this drop with the motor current which flows at minimum supply voltage and a stalled or highly loaded motor, depending on design requirements. For the values shown, the motor current varies from approximately one ampere to as much as 12 amperes. For another motor, resistor 18 would be chosen to provide a similar voltage drop at the maximum load and minimum supply voltage and resistor 28 would be chosen to provide a saturating base current to Q1 at these values.

Resistor 24 and potentiometer 26 are chosen to bypass some portion of the base current of Q1, thereby leading to a new value of Q1 base to emitter voltage and hence lower possible controlled speeds as the bypassed current increases.

The value of resistor 28 must be chosen so that Q1 base voltage is always higher than Q1 emitter voltage during normal operating conditions, because, as has been discussed, a reversal of Q1 base to emitter voltage will shut-down the entire circuit.

Although I have shown what I consider to be the preferred embodiment of my invention and have additionally disclosed a design procedure to be followed in determining the values and types of circuit elements desirable, certain alterations and modifications will become apparent to one skilled in the art. I do not wish to limit my invention to the specific form shown and accordingly do hereby claim as my invention the subject matter including modifications and alterations thereof encompassed by the true scope and spirit of the appended claims.

What is claimed is:

1. A speed control system for permanent magnet motor comprising
   a first terminal,
   a source of direct current connected between said first terminal and ground,
   a second terminal,
   a motor connected between said second terminal and ground,
   a first resistor connected at one end to said second terminal,
   a first transistor having emitter, base, and collector terminals, the circuit through said first transistor between said emitter and collector being connected between said first resistor other end and said first terminal,
   a second resistor connected between said first terminal and said fist transistor base terminal,
   a third resistor having one end connected to ground,
   a diode connected between said second terminal and said third resistor,
   a second transistor having emitter, base and collector terminals, the circuit through said second transistor between said emitter and collector being connected between said base terminal of said first transistor and the junction of said diode and said third resistor,
   a fourth resistor connected between said base terminal of said second transistor and the junction of said said first resistor and said first transistor,
   a potentiometer connected between said base terminal of said second transistor and ground, and
   a capacitor connected between said first terminal and said base terminal of said second transistor.

2. A speed control system for a permanent magnet motor having first and second motor terminals comprising:
   a direct current source having one end connected to said second motor terminal, and having a second end,
   current regulating means having an input electrode connected to said source second end, an output electrode and a control electrode,
   first resistive means for connecting said input and control electrodes,
   means connected between said output electrode and said first motor terminal and responsive to current therethrough for generating a feedback voltage,
   means having first and second control electrodes and an output electrode connected to said regulating means control electrode for controlling said regulating means;
   second resistive means for connecting said second control electrode to said second motor terminal,
   linear means for connecting said current regulating means output electrode to said first control electrode,
   non-linear means for clamping said first motor terminal to said second control electrode when the voltage at said first motor terminal equals the voltage at said first control electrode.

3. A speed control system as recited in claim 2 wherein said linear means comprises a variable voltage dividing network connected between said current regulating means output electrode and said second motor terminal and having an intermediate point connected to said first control electrode.

4. A speed control system as recited in claim 3 with additionally pulse means for applying a voltage pulse to said first control electrode.

5. A speed control as recited in claim 4 wherein said pulse means comprises a capacitor connectable between said first control electrode and said direct current source another end.

References Cited
UNITED STATES PATENTS

| | | | |
|---|---|---|---|
| 2,751,549 | 6/1956 | Chase. | |
| 2,975,349 | 3/1961 | Green | 318—345 |
| 2,991,407 | 7/1961 | Murphy. | |
| 3,368,134 | 2/1968 | Mead et al. | 318—341 |
| 3,396,323 | 8/1968 | Auld | 318—345 |
| 3,231,808 | 1/1966 | McDaniel | 318—331 |
| 3,393,353 | 1/1968 | Martin | 318—331 |
| 3,422,331 | 1/1969 | Kearns | 318—331 |

ORIS L. RADER, Primary Examiner

K. L. CROSSON, Assistant Examiner

U.S. Cl. X.R.
318—341, 345